United States Patent
Zhang

(10) Patent No.: US 10,073,213 B2
(45) Date of Patent: Sep. 11, 2018

(54) LIQUID CRYSTAL DISPLAY MODULE AND METHOD FOR MANUFACTURING THE SAME

(71) Applicant: SHENZHEN CHINA STAR OPTOELECTRONICS TECHNOLOGY CO., LTD., Shenzhen (CN)

(72) Inventor: Yanxue Zhang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 7 days.

(21) Appl. No.: 14/417,939

(22) PCT Filed: Dec. 25, 2014

(86) PCT No.: PCT/CN2014/094885
§ 371 (c)(1),
(2) Date: Jan. 28, 2015

(87) PCT Pub. No.: WO2016/086475
PCT Pub. Date: Jun. 9, 2016

(65) Prior Publication Data
US 2017/0269288 A1    Sep. 21, 2017

(30) Foreign Application Priority Data

Dec. 2, 2014    (CN) .......................... 2014 1 0719834

(51) Int. Cl.
*B29C 69/02* (2006.01)
*F21V 8/00* (2006.01)
(Continued)

(52) U.S. Cl.
CPC ............ *G02B 6/0088* (2013.01); *B29C 45/14* (2013.01); *B29C 69/02* (2013.01); *G02B 6/0055* (2013.01);
(Continued)

(58) Field of Classification Search
None
See application file for complete search history.

(56) References Cited

U.S. PATENT DOCUMENTS 8,382,356 B2    2/2013 Li et al.
2008/0062722 A1    3/2008 Wang et al.
(Continued)

FOREIGN PATENT DOCUMENTS

CN    101749568 A    6/2010
CN    201779541 U    3/2011
(Continued)

OTHER PUBLICATIONS

International Search Report and Written Opinion of the International Searching Authority (Forms PCT/ISA/220, PCT/ISA/237 and PCT/ISA/210) dated Aug. 17, 2015, by the State Intellectual Property Office of China in corresponding International Application No. PCT/CN2014/094885. (12 pages).

(Continued)

*Primary Examiner* — Monica A Huson
(74) *Attorney, Agent, or Firm* — Buchanan Ingersoll & Rooney PC

(57) ABSTRACT

A liquid crystal display module and a method for manufacturing the liquid crystal display module are disclosed. The liquid crystal display module comprises a reflective sheet, a frame body, a frame, and a light guide plate. The frame body includes a base plate having an upper surface which is provided with an accommodating area for accommodating the reflective sheet. The reflective sheet is partially or (Continued)

completely accommodated in the accommodating area, so that the liquid crystal display module can be thinned. Moreover, the overall strength of the liquid crystal module can be ensured. In addition, the material for the base plate can be effectively saved, which is beneficial for saving costs.

17 Claims, 6 Drawing Sheets

(51) Int. Cl.
    *B29C 45/14*     (2006.01)
    *G02F 1/1333*     (2006.01)
    *G02F 1/1335*     (2006.01)
    *B29L 31/34*     (2006.01)

(52) U.S. Cl.
    CPC ......... *G02B 6/0065* (2013.01); *G02F 1/1333* (2013.01); *G02F 1/1335* (2013.01); *G02F 1/133308* (2013.01); *B29C 45/1418* (2013.01); *B29L 2031/3475* (2013.01); *G02F 2001/133317* (2013.01)

(56) References Cited

U.S. PATENT DOCUMENTS

2015/0043244 A1*   2/2015   Kim ................... G02B 6/0031
                                                             362/609
2015/0198763 A1    7/2015   Yu

FOREIGN PATENT DOCUMENTS

| CN | 202631911 U | 12/2012 |
| CN | 202791467 U | 3/2013 |
| CN | 103727467 A | 4/2014 |
| CN | 203982037 U | 12/2014 |

OTHER PUBLICATIONS

Notification of Transmittal of the International Search Report and the Written Opinion of the International Searching Authority (Forms PCT/ISA/220, PCT/ISA/237, and PCT/ISA/210) dated Aug. 17, 2015, by the State Intellectual Property Office of People's Republic of China in corresponding International Application No. PCT/CN2014/094885. (12 pages).

\* cited by examiner

LIQUID CRYSTAL DISPLAY MODULE AND METHOD FOR MANUFACTURING THE SAME

The present application claims benefit of Chinese patent application CN 201410719834.8, entitled "Liquid crystal display module and method for manufacturing the same" and filed on Dec. 2, 2014, the entirety of which is incorporated herein by reference.

FIELD OF THE INVENTION

The present disclosure relates to the field of liquid crystal display, and in particular, to a liquid crystal display module. The present disclosure further relates to a method for manufacturing the liquid crystal display module.

BACKGROUND OF THE INVENTION

As the liquid crystal display technology develops, ultra-thin electronic products have become one of the important directions for small and medium size products. When an existing electronic product is designed, a method of removing a fixed iron frame of a liquid crystal display module is usually used to achieve the purpose of thinning the electronic product. This method has the following defect. While a relatively small-sized electronic product will not be significantly influenced after being removed of the fixed iron frame therefrom, for a relatively large-sized electronic product, especially that having a relatively thin light guide plate (LGP), removal of the fixed iron frame therefrom would seriously decrease the overall strength of the electronic product. As a result, there is an urgent need of a liquid crystal display module that can thin the electronic product while ensuring the overall strength of the product.

SUMMARY OF THE INVENTION

The technical problem to be solved by the present disclosure is as follows. In the prior art, a fixed iron frame of a liquid crystal display module is usually removed to achieve the purpose of thinning an electronic product. This thinning method has the following defect. For a relatively large-sized electronic product, especially that having a relatively thin light guide plate, removal of the fixed iron frame therefrom would decrease the overall strength of the electronic product.

In order to solve the above technical problem, a liquid crystal display module that can thin the electronic product while ensuring the overall strength of the product is provided according to the present disclosure.

The technical solution of the present disclosure is as follows. A liquid crystal display module is provided, comprising: a reflective sheet; a frame body, which includes a base plate having edges each bending upward to form side plates, wherein an upper surface of the base plate is provided with an accommodating area for accommodating the reflective sheet; and a frame and a light guide plate, both arranged in a space defined by the side plates.

Preferably, the accommodating area is in the form of a through hole provided on the upper surface of the base plate.

Preferably, the accommodating area is in the form of a recess provided on the upper surface of the base plate.

Preferably, an upper surface of the reflective sheet and the upper surface of the base plate are located in one and the same plane.

Preferably, an outer wall of the reflective sheet is fixedly connected to an inner wall of the accommodating area.

Preferably, the outer wall of the reflective sheet is fixedly connected to the inner wall of the accommodating area via viscose.

Preferably, the upper surface of the reflective sheet is fixedly connected to a lower surface of the light guide plate.

Preferably, the upper surface of the reflective sheet is fixedly connected to the lower surface of the light guide plate via viscose.

Preferably, an outer wall of the frame is fixedly connected to an inner wall of the side plate, and the light guide plate is arranged in a space which is defined by inner walls of the frame.

A method for manufacturing the above liquid crystal display module is provided, comprising: stamping the base plate which is to be treated, so as to enable each of the edges of the base plate to bend upwards to form a side plate, and to provide the upper surface of the base plate with the accommodating area for accommodating the reflective sheet, whereby the frame body is formed; placing the frame body into an injection mold, so that the frame can be formed in the space defined by the side plates; placing the reflective sheet into the accommodating area; and placing the light guide plate into the space defined by the side plates, such that the liquid crystal display module is obtained.

Compared with the prior art, one or more of the above embodiments has the following advantages or beneficial effects.

In the liquid crystal display module according to the embodiments of the present disclosure, the upper surface of the base plate is provided with the accommodating area, for accommodating the reflective sheet therein either partially or completely, so that the thickness of the liquid crystal display module can be equal to the sum of the thickness of the base plate, the thickness of the part of the reflective sheet which is placed outside of the accommodating area, and the thickness of the frame. The thickness of the part of the reflective sheet that is placed within the accommodating area will not add to the thickness of the liquid crystal display module, thereby thinning the entire thickness of the liquid crystal display module. Moreover, the reflective sheet can be partially or completely placed within the accommodating area of the base plate, so that the liquid crystal display module can be thinned on the whole, while the frame 10 is not removed. This ensures the strength of the liquid crystal display module as a whole. In addition, the accommodating area can be provided on the base plate, to effectively save material for the base plate, which is beneficial for saving costs.

Other features and advantages of the present disclosure will be further explained in the following description, and partly become self-evident therefrom, or be understood through implementing the present disclosure. The objectives and advantages of the present disclosure will be achieved through the structure specifically pointed out in the description, claims, and the accompanying drawings.

BRIEF DESCRIPTION OF THE DRAWINGS

The drawings are provided for further understanding of the present disclosure, and constitute one part of the description. They serve to explain the present disclosure in conjunction with the embodiments, rather than to limit the present disclosure in any manner. In the drawings.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the embodiments may be combined together in any manner, and the technical solutions obtained in this manner all fall within the scope of the present disclosure.

The technical problem to be solved by the present disclosure is as follows. In the prior art, a fixed iron frame of a liquid crystal display module is usually removed to achieve the purpose of thinning an electronic product. This thinning method has the following defect. For a relatively large-sized electronic product, especially that having a relatively thin light guide plat, removal of the fixed iron frame therefrom would seriously decrease the overall strength of the electronic product. In order to solve the above technical problem, a liquid crystal display module that can thin the electronic product while ensuring the overall strength of the product is provided according to the embodiments of the present disclosure.

Figure 1:
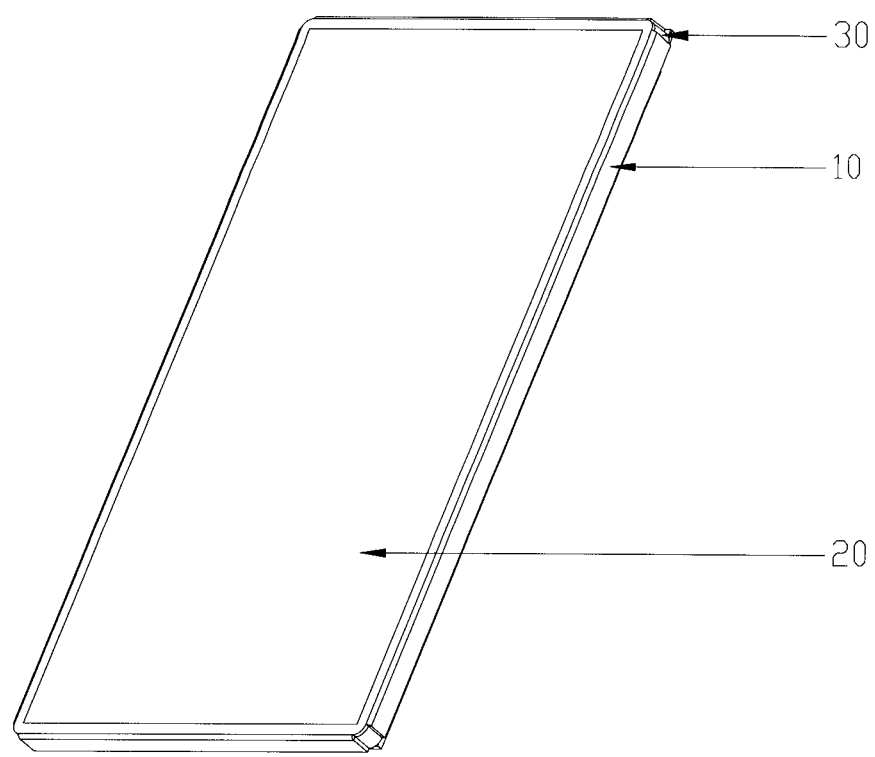
FIG. 1 schematically shows the structure of a liquid crystal display module according to an embodiment of the present disclosure, wherein a light guide plate of the liquid crystal display module is not shown.

FIG. 1 schematically shows the structure of a liquid crystal display module according to an embodiment of the present disclosure. In order to explicitly show an inner structure of the liquid crystal display module, a light guide plate which constitutes a part of the liquid crystal display module is not indicated in this drawing. The liquid crystal display module comprises a frame body 10, a reflective sheet 20, a frame 30, and a light guide plate (not shown in the drawing).

Figure 2:
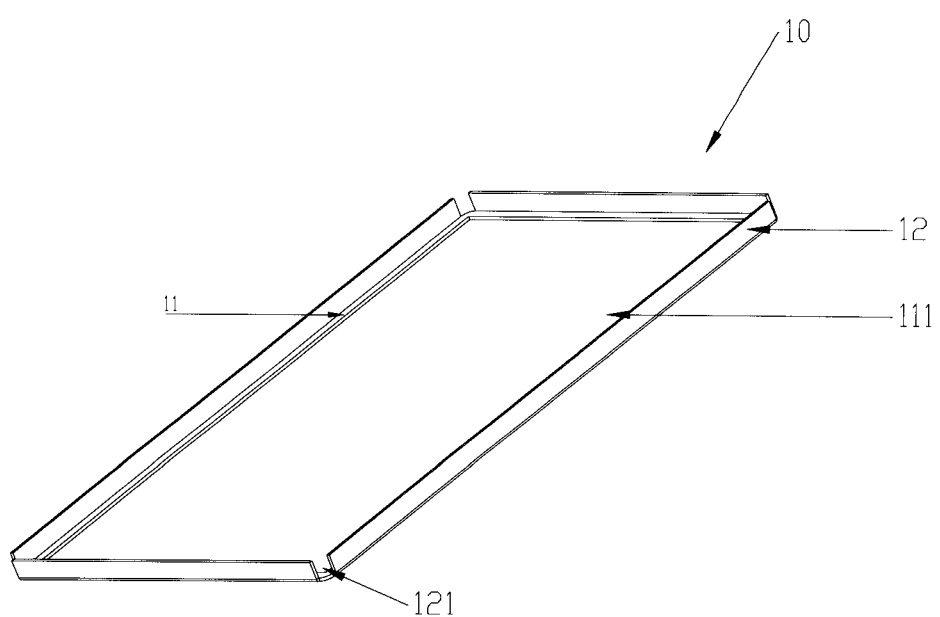
FIG. 2 schematically shows the structure of a frame body according to an embodiment of the present disclosure.

Specifically, reference can be made to FIG. 2, which is a structural diagram of the frame body 10 according to an embodiment of the present disclosure. In the embodiment as shown in FIG. 2, the frame body 10 comprises a rectangular-shaped base plate 11, which is made of iron material or stainless steel. The base plate 11 has four edges bending upward to form four side plates 12, respectively. Particularly, in order to facilitate assembling of the frame 30 and the light guide plate together, an angle of 90° can be preferably formed between each side plate 12 and the base plate 11. That is, each edge of the base plate 11 bends upward for 90° to form the side plate 12. In addition, the base plate 11 and the side plates 12 are generally formed through a stamping procedure. In order to facilitate the stamping procedure, a gap 121 can be arranged between every two adjacent edges. Such being the case, the four side plates 12 of the base plate 11 define a space for accommodating the frame 30 and the light guide plate. The frame 30 can be specifically arranged in a manner as shown in FIG. 3.

Figure 3:
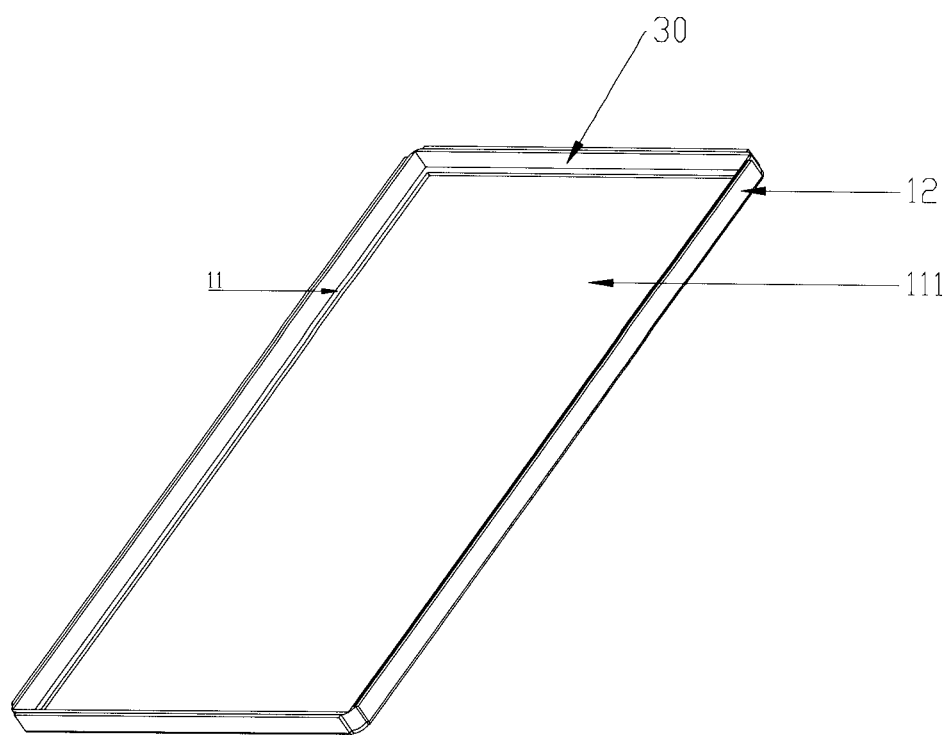
FIG. 3 schematically shows mounting of a frame to the frame body as illustrated in FIG. 2.

FIG. 3 schematically shows mounting of the frame 30 to the frame body 10 as illustrated in FIG. 2. As FIG. 3 shows, the frame 30 is formed with four rubber side plates which are connected to one another successively. The size of each rubber side plate matches with that of a corresponding side plate 12 of the frame body 10. When the frame 30 is mounted, an outer wall of each rubber side plate can be fit to an inner wall of a corresponding side plate 12. Preferably, the outer wall of each rubber side plate is fixedly connected via, for example, adhesive, to the inner wall of a corresponding side plate 12. Inner walls of the frame 30 engage with edges of the light guide plate, so that the light guide plate and the frame 30 can be assembled together. Particularly, a slot can be provided circumferentially along the inner walls of the frame 30, so that the light guide plate can be mounted to the frame 30 through engagement between the slot and the four edges of the light guide plate.

Figure 4:
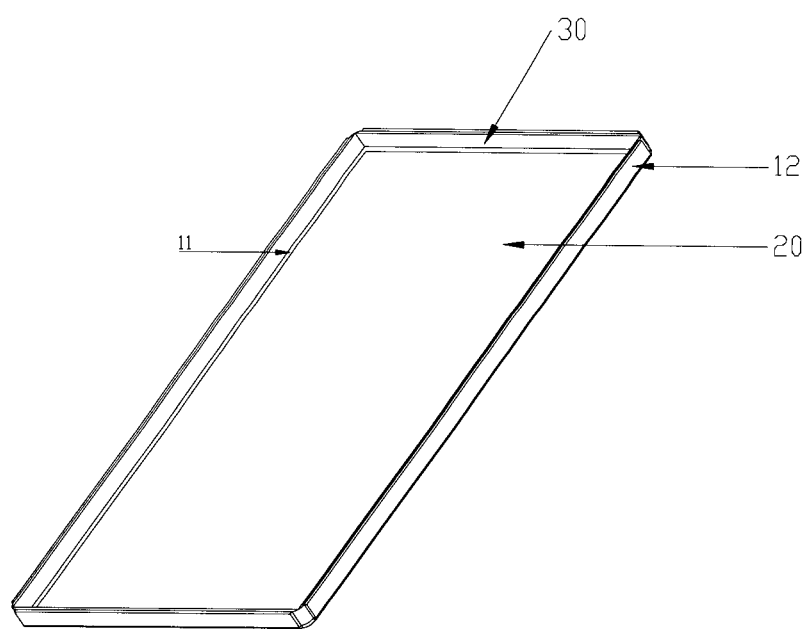
FIG. 4 schematically shows mounting of a reflective sheet to the frame body and the frame that are illustrated in FIG. 3.

FIG. 4 schematically shows mounting of the reflective sheet 20 to the frame body 10 and the frame 30 as illustrated in FIG. 3. As FIG. 4 indicates, an upper surface of the base plate 11 is provided with an accommodating area for accommodating the reflective sheet 20. In the embodiment as shown in FIG. 4, the upper surface of the base plate 11 is provided with a through hole 111 for accommodating the reflective sheet 20, the walls of the through hole matching with edges of the reflective sheet 20 in shape. As such, the reflective sheet 20 can be partially or completely accommodated within the through hole 111.

In this embodiment, the upper surface of the base plate 11 is provided with the accommodating area, which can accommodate the reflective sheet 20 either partially or completely therein. As a result, the liquid crystal display module can have a thickness equal to a sum of the thickness of the base plate 11, the thickness of the part of the reflective sheet which is located outside of the accommodating area, and the thickness of the frame 30. By contrast, the thickness of the part of the reflective sheet which is located within the accommodating area will not increase the thickness of the liquid crystal display module. As a result, the liquid crystal display module can be thinned as a whole. Besides, the reflective sheet 20 can be partially or completely accommodated within the accommodating area of the base plate 11, so that the entire thickness of the liquid crystal display module is reduced without the frame body 10 removed. This ensures the entire strength of the liquid crystal display module. In addition, the base plate 11 is provided with the accommodating area, thus effectively saving material for making the base plate 11, which is beneficial for saving costs.

Figure 5:
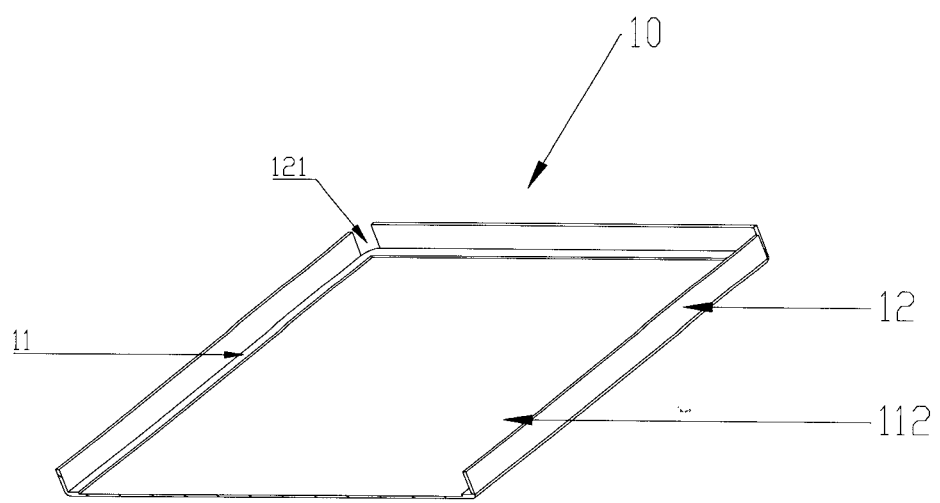
FIG. 5 schematically shows the structure of a frame body according to another embodiment of the present disclosure.

Furthermore, the accommodating area for accommodating the reflective sheet 20 can be in the form of the through hole 111 or a recess 112 provided on the upper surface of the base plate 11. FIG. 5 schematically shows the structure of the frame body 10 according to another embodiment of the present disclosure. In order to explicitly show the structure of the frame body 10 in the present embodiment, only the structure of a right portion of the frame body 10 is indicated in FIG. 5. A left portion of the frame body is symmetrically arranged with the right portion thereof in structure. In the embodiment as shown in FIG. 5, the frame body 10 comprises a rectangular-shaped base plate 11, which is made of iron material or stainless steel. The base plate 11 has four edges bending upward to form four side plates 12, respectively. Particularly, in order to facilitate assembling of the frame 30 and the light guide plate together, an angle of 90° is preferably formed between each side plate 12 and the base plate 11. That is, each edge of the base plate 11 bends upward for 90° to form a corresponding side plate 12. Moreover, the base plate 11 and the side plates 12 are generally formed through a stamping procedure. In order to facilitate the stamping procedure, a gap 121 can be arranged between every two adjacent edges. Such being the case, the four side plates 12 of the base plate 11 define a space for accommodating the frame 30 and the light guide plate. In addition, the upper surface of the base plate 11 can be provided with a recess 112 for accommodating the reflective sheet 20. The slot walls of the recess 112 match with edges of the reflective sheet 20 in shape. As such, the reflective sheet 20 can be partially or completely accommodated within the recess 112.

In a preferred embodiment of the present disclosure, an upper surface of the reflective sheet 20 and the upper surface of the base plate 11 are located in one and the same plane. That is, the reflective sheet 20 is completely accommodated within the accommodating area of the base plate 11. Since the reflective sheet 20 is completely embedded into the accommodating area of the base plate 11, it will not add to the thickness of the liquid crystal display module.

In the following two embodiments, two preferred manners for fixing the reflective sheet 20 will be described in detail, respectively.

In a preferred embodiment of the present disclosure, an outer wall of the reflective sheet 20 is fixedly connected to an inner wall of the accommodating area, particularly, via adhesive or interference fit.

In another preferred embodiment of the present disclosure, an upper surface of the reflective sheet 20 is fixedly connected to a lower surface of the light guide plate, particularly, via adhesive.

Figure 6:
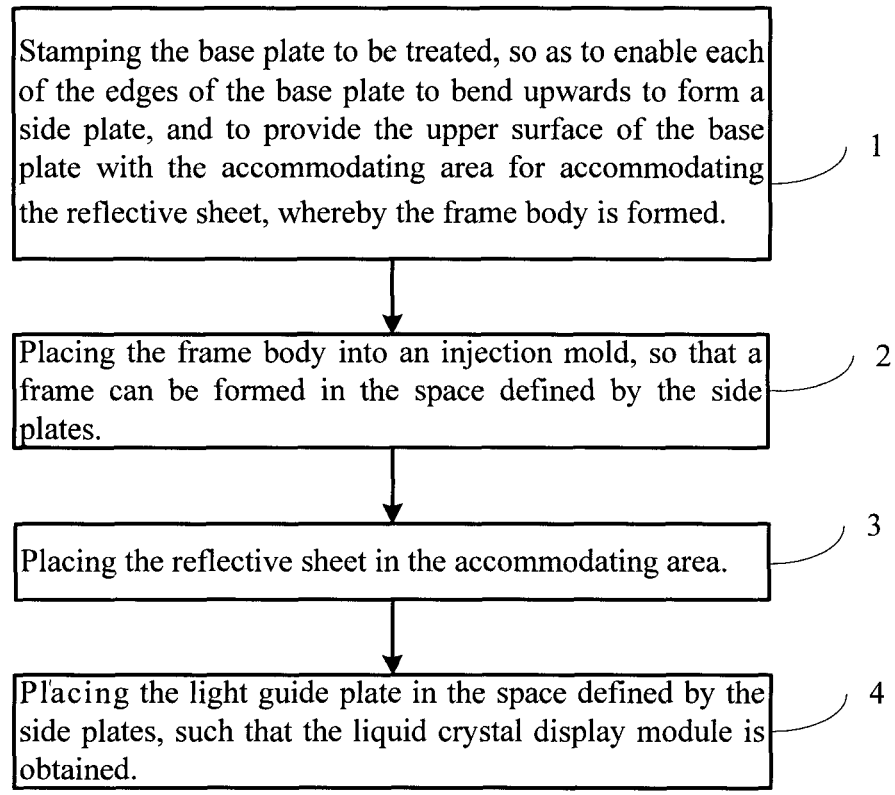
FIG. 6 shows a flow chart of a method for manufacturing the liquid crystal display module according to the embodiments of the present disclosure.

In an embodiment of the present disclosure, a method for manufacturing the above liquid crystal display module is further provided. FIG. 6 shows a flow chart of the method for manufacturing the liquid crystal display module according to the embodiment of the present disclosure. The method comprises the following steps.

In step (1), a stamping procedure is performed to the base plate 11 to be treated, so that the edges of the base plate 11 each bend upwards to form the side plates 12, and the upper surface of the base plate 11 is provided with an accommodating area, for accommodating the reflective sheet 20. Thus, the frame 10 is formed.

Specifically, the base plate 11 to be treated can be commonly made of iron material or stainless steel. The base plate 11 and the side plates 12 can be formed through the stamping procedure, and the accommodating area for accommodating the reflective sheet 20 can be stamped out on the upper surface of the base plate 11. Since the stamping procedure is commonly used by those skilled in the art when an iron or stainless steel panel is treated into a specific shape, it will not be explained in detail herein.

In step (2), the frame 10 is placed into an injection mold, so that the frame 30 can be formed in the space that has been defined by the side plates 12.

Specifically, in this step, the frame body 10 formed through the stamping procedure is placed into the injection mold, so that an integral product including a rubber frame and an iron frame body can be formed through injection molding. That is, injection molding is performed in the space defined by the side plates 12 to form the frame 30. In particular, injection molding is performed on the inner walls of the side plates 12 to form the frame 30. As such, the frame 30 and the inner walls of the side plates 12 can be completely matched with and fit to each other.

In step (3), the reflective 20 is placed in the accommodating area.

Specifically, in this step, the reflective sheet 20 can be placed in two different manners.

According to one manner, the outer wall of the reflective sheet 20 can be fixedly connected to the inner wall of the accommodating area. Particularly, adhesive can be provided on the outer wall of the reflective sheet 20, thus enabling the outer wall of the reflective sheet 20 to be fixedly connected to the inner wall of the accommodating area via the adhesive. Alternatively, the outer wall of the reflective sheet 20 can be connected to the inner wall of the accommodating area through interference fit.

According to the other manner, the upper surface of the reflective sheet 20 can be fixedly connected to the lower surface of the light guide plate. Particularly, adhesive can be provided on the upper surface of the reflective sheet 20, so that the upper surface of the reflective sheet 20 can be fixedly connected to the lower surface of the light guide plate via the adhesive.

In step (4), the light guide plate is placed into the space defined by the side plates 12, so that the liquid crystal display module can be obtained.

Specifically, in this step, the light guide plate can be placed via two different manners.

According to one manner, adhesive can be provided along four edges of the light guide plate, so that the four edges of the light guide plate can be fixedly connected to the inner walls of the frame 30.

According to the other manner, a slot can be provided circumferentially along the inner walls of the frame 30, to engage the four edges of the light guide plate. Thus, the light guide plate can be mounted to the frame 30 through engagement between the slot and the four edges of the light guide plate.

The liquid crystal display module can be obtained after the light guide plate is amounted to the frame 30.

The method for manufacturing the liquid crystal display module according to this embodiment is easy to operate. The frame body 10 can be placed into an injection molding machine to form the frame 30, such that the frame 30 and the frame body 10 can be completely matched with and fit to each other. The accommodating area for accommodation of the reflective sheet 20 can be stamped on the base plate 11, so that the thickness of the liquid crystal display module can be equal to the sum of the thickness of the base plate 11, the thickness of the part of the reflective sheet which is placed outside of the accommodating area, and the thickness of the frame 30. The thickness of the part of the reflective sheet that is placed within the accommodating area will not add to the thickness of the liquid crystal display module, thereby reducing the entire thickness of the liquid crystal display module. Moreover, the reflective sheet 20 can be partially or completely placed within the accommodating area of the base plate 11, so that the liquid crystal display module can be thinned on the whole, while the frame 10 is not removed. This ensures the strength of the liquid crystal display module as a whole. In addition, the accommodating area can be provided on the base plate 11 to effectively save material for the base plate, which is beneficial for saving costs.

Although the present disclosure has been described with reference to preferred embodiments, various modifications and variants to the present disclosure may be made by anyone skilled in the art, without departing from the scope and spirit of the present disclosure. In particular, as long as there is no structural conflict, various embodiments as well as the respective technical features mentioned herein may be combined with one another in any manner. The present disclosure is not limited to the specific embodiments disclosed herein, but rather includes all the technical solutions falling within the scope of the claims.

The invention claimed is:

1. A method for manufacturing a liquid crystal display module, wherein the liquid crystal display module comprises:
   a reflective sheet;
   a frame body, which includes a base plate having edges each bending upward to form side plates, wherein an upper surface of the base plate is provided with an accommodating area for accommodating the reflective sheet; and
   a frame and a light guide plate, both arranged in a space defined by the side plates, and
   wherein the method comprises:
   stamping the base plate to be treated, so as to enable each of the edges of the base plate to bend upwards to form a side plate, and to provide the upper surface of the base plate with the accommodating area for accommodating the reflective sheet, whereby the frame body is formed;
   placing the frame body into an injection mold, so that a frame can be formed in the space defined by the side plates;
   placing the reflective sheet in the accommodating area, wherein an upper surface of the reflective sheet and the upper surface of regions other than the accommodating area of the base plate are located in one and the same plane; and
   placing the light guide plate in the space defined by the side plates, such that the liquid crystal display module is obtained.

2. The method according to claim 1, wherein an outer wall of the reflective sheet is fixedly connected to an inner wall of the accommodating area.

3. The method according to claim 2, wherein the outer wall of the reflective sheet is fixedly connected to the inner wall of the accommodating area through adhesive.

4. The method according to claim 1, wherein the upper surface of the reflective sheet is fixedly connected to a lower surface of the light guide plate.

5. The method according to claim 4, wherein the upper surface of the reflective sheet is fixedly connected to the lower surface of the light guide plate through adhesive.

6. The method according to claim 1, wherein the accommodating area is in the form of a through hole provided on the upper surface of the base plate.

7. The method according to claim 6, wherein an upper surface of the reflective sheet and the upper surface of the base plate are located in one and the same plane.

8. The method according to claim 6, wherein an outer wall of the reflective sheet is fixedly connected to an inner wall of the accommodating area.

9. The method according to claim 8, wherein the outer wall of the reflective sheet is fixedly connected to the inner wall of the accommodating area through adhesive.

10. The method according to claim 6, wherein the upper surface of the reflective sheet is fixedly connected to a lower surface of the light guide plate.

11. The method according to claim 10, wherein the upper surface of the reflective sheet is fixedly connected to the lower surface of the light guide plate through adhesive.

12. The method according to claim 1, wherein the accommodating area is in the form of a recess provided on the upper surface of the base plate.

13. The method according to claim 12, wherein an outer wall of the reflective sheet is fixedly connected to an inner wall of the accommodating area.

14. The method according to claim 13, wherein the outer wall of the reflective sheet is fixedly connected to the inner wall of the accommodating area through adhesive.

15. The method according to claim 12, wherein the upper surface of the reflective sheet is fixedly connected to a lower surface of the light guide plate.

16. The method according to claim 15, wherein the upper surface of the reflective sheet is fixedly connected to the lower surface of the light guide plate through adhesive.

17. The method according to claim 1, wherein an outer wall of the frame is fixedly connected to an inner wall of the side plate, and
   wherein the light guide plate is arranged in a space which is defined by inner walls of the frame.

* * * * *